US008155864B2

(12) United States Patent
Picron et al.

(10) Patent No.: US 8,155,864 B2
(45) Date of Patent: Apr. 10, 2012

(54) METHOD AND DEVICE FOR CONTROLLING A COMBUSTION ENGINE DURING A TEMPORARY STOPPAGE

(75) Inventors: Vanessa Picron, Pontoise (FR); Claudine Rochette, Pontoise (FR); Claudiu Vasilescu, Paris (FR); Anthony Girardin, Meudon (FR); Benoit Bizet, Pontoise (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 459 days.

(21) Appl. No.: 12/374,503

(22) PCT Filed: Jul. 25, 2007

(86) PCT No.: PCT/FR2007/001274
§ 371 (c)(1),
(2), (4) Date: May 21, 2009

(87) PCT Pub. No.: WO2008/012431
PCT Pub. Date: Jan. 31, 2008

(65) Prior Publication Data
US 2009/0287399 A1 Nov. 19, 2009

(30) Foreign Application Priority Data
Jul. 25, 2006 (FR) ...................... 06 06798

(51) Int. Cl.
*G06F 19/00* (2006.01)
(52) U.S. Cl. ............... 701/112; 123/320; 123/90.11; 123/198 F

(58) Field of Classification Search .......... 123/320–322, 123/345–348, 90.11, 90.15, 198 F, 481; 701/112, 701/113
See application file for complete search history.

(56) References Cited

U.S. PATENT DOCUMENTS

| 6,257,194 | B1 | 7/2001 | Kerns et al. |
| 7,021,289 | B2* | 4/2006 | Lewis et al. ............... 123/437 |
| 7,165,520 | B2* | 1/2007 | Lewis et al. ............... 123/90.15 |
| 7,167,792 | B1 | 1/2007 | Kolmanovsky et al. |
| 7,194,993 | B2* | 3/2007 | Lewis et al. ............... 123/179.16 |
| 7,280,909 | B2* | 10/2007 | Lewis et al. ............... 701/113 |
| 2002/0138182 | A1 | 9/2002 | Swales et al. |
| 2005/0279323 | A1 | 12/2005 | Lewis et al. |

OTHER PUBLICATIONS

International Search Report w/translation from PCT/FR2007/001274 dated Jan. 15, 2008 (4 pages).

* cited by examiner

*Primary Examiner* — John Kwon
(74) *Attorney, Agent, or Firm* — Osha • Liang LLP

(57) ABSTRACT

A method for controlling, during temporary stoppage, a four-stroke combustion engine including a block delimiting cylinders which define combustion chambers equipped with pistons into which opens an intake pipe and an exhaust pipe, both provided with valves that can move between open and closed positions. The method involves detecting conditions of a temporary stoppage of the engine and commanding the exhaust valves to be kept in the closed position once the engine has gone through an intake phase during the last engine cycle prior to the stoppage.

6 Claims, 2 Drawing Sheets

METHOD AND DEVICE FOR CONTROLLING A COMBUSTION ENGINE DURING A TEMPORARY STOPPAGE

The present invention concerns a method for controlling an internal combustion engine during a temporary stoppage and the corresponding device.

BACKGROUND OF THE INVENTION

An automobile vehicle four-stroke internal combustion engine generally includes a block delimiting cylinders defining combustion chambers in each of which is mounted a piston connected to a crankshaft connected via the gearbox to wheels of the automobile vehicle to drive them in rotation. Into each combustion chamber open an intake pipe and an exhaust pipe provided with valves mobile between open and closed positions. The valves are moved between their two positions by camshafts driven by the internal combustion engine. The internal combustion engine also includes a device for feeding the combustion chambers with fuel and an engine control unit connected to the fuel supply device and to the ignition circuit in the case of a controlled ignition engine. Electrical power used on board the vehicle is supplied by an alternator driven by the internal combustion engine and connected to the battery of the vehicle to charge it. The engine is started by a starter motor that is connected to the battery and which has an output gear meshing with a toothed ring fastened to the crankshaft.

It is also known to use a combined alternator/starter motor that provides the alternator and starter motor functions alternately.

The alternator/starter motor when operated as a starter motor provides for fast starting of the engine. When the engine equips an automobile vehicle, it is then possible to envisage stopping the engine temporarily each time that the vehicle is stationary (for example in a traffic jam or at a red light) and to start the engine as soon as the driver indicates their intention to move forward, for example by selecting a gear. When the internal combustion engine is stopped, the actuator immobilizes the valves as quickly as possible in order to reduce the noise associated with movement of the valves, which noise could prove a nuisance when the engine is stopped, at which time the general noise level is relatively low.

However, frequent starting of the engine causes battery charging problems and therefore problems with the rating of the battery.

OBJECT OF THE INVENTION

An object of the invention is to provide a method and a device that facilitate starting the engine.

SUMMARY OF THE INVENTION

To this end, the invention provides a method for controlling, during a temporary stoppage, a four-stroke internal combustion engine including a block delimiting cylinders which define combustion chambers which are equipped with pistons and into which there open an intake pipe and an exhaust pipe both provided with valves that can move between open positions and closed positions, the method including steps of detecting the conditions of a temporary stoppage of the engine and of commanding that the intake valves be kept in the closed position once the engine has gone through an intake stroke during the last engine cycle prior to the temporary stoppage.

Thus the cylinder on the admission stroke remains filled until restarting so that the starting torque is applied on the first crankshaft half-turn. The exhaust valves are preferably also held closed during the last cycle of the engine prior to the temporary stoppage.

Thus, during a temporary stoppage, the cylinder that would normally be empty at the end of the exhaust stroke is filled with compressed gas so that on starting the engine it has the benefit of an additional torque resulting from the expansion of this gas.

According to one advantageous aspect of the invention, in relation to an engine employing direct injection of fuel, the method includes the step of stopping injection during an intake stroke preceding the holding of the exhaust valves in the closed position. This prevents discharging unburned fuel into the atmosphere on starting the engine.

Another aspect of the invention concerns a device for controlling a four-stroke internal combustion engine including a block delimiting cylinders which define combustion chambers which are equipped with pistons and into which there open an intake pipe and an exhaust pipe both provided with valves that can move between open positions and closed positions, the internal combustion engine also including a device for supplying the combustion chambers with fuel and at least one electromagnetic valve actuator, wherein a control unit is configured to detect the conditions of a temporary stoppage of the engine and to command holding of the intake valves and the exhaust valves in the closed position after passing through an intake stroke during a last cycle of the engine prior to the stoppage.

In one particular embodiment, the fuel supply device includes an injector for each combustion chamber and the control unit is adapted to stop the engine temporarily by commanding stopping of the injector and immobilization of the valve controlled by the actuator in successive combustion chambers.

Holding the valves in the closed position establishes counter-pressures in the combustion chambers that oppose movement of the pistons and therefore speeds up stopping the engine. Furthermore, immobilizing the intake valve in the closed position at the end of an intake stroke retains cool gases in the cylinders, which facilitates starting the engine.

Other features and advantages of the invention will emerge on reading the following description of one particular non-limiting embodiment of the invention.

BRIEF DESCRIPTION OF THE DRAWINGS

Reference will be made to the appended drawings, in which.

DETAILED DESCRIPTION OF THE INVENTION

Figure 1:
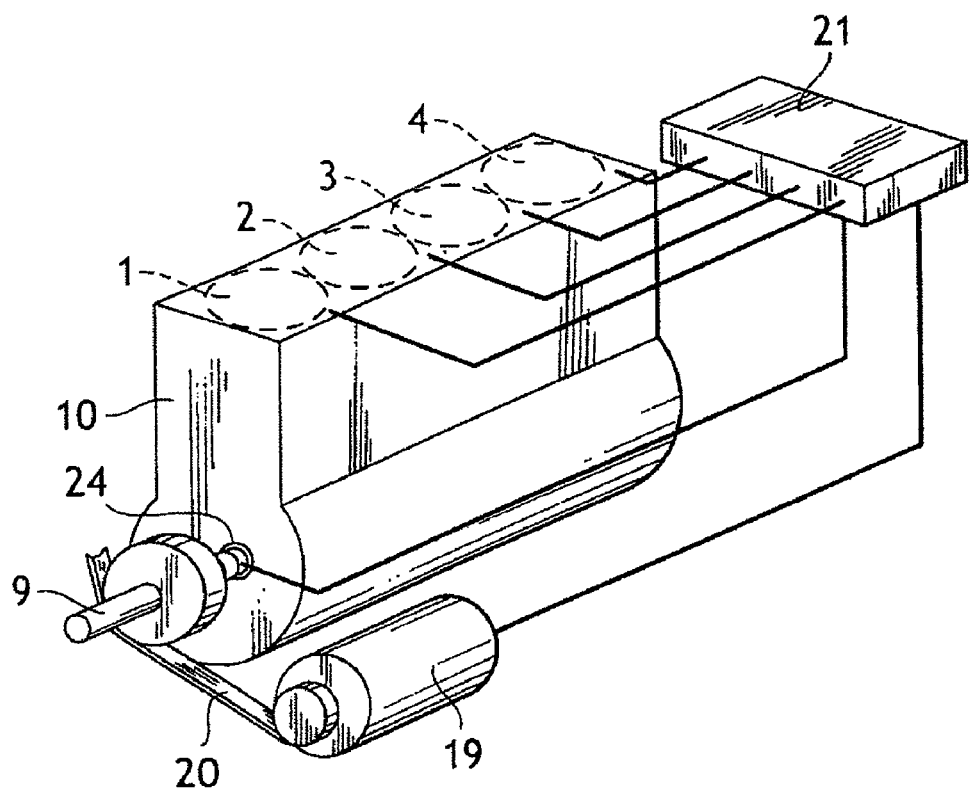
FIG. 1 is a diagrammatic perspective view of an internal combustion engine incorporating a control device of the invention.
Figure 2:
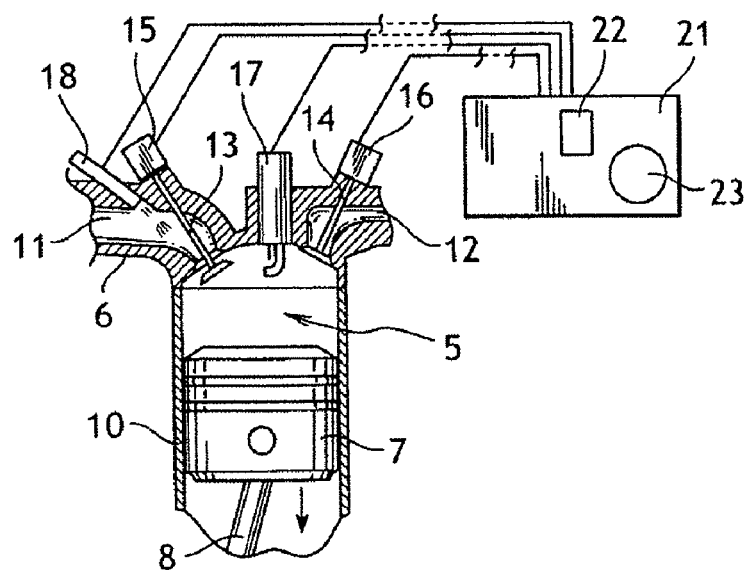
FIG. 2 is a partial diagrammatic view of the engine in cross section.

Referring to the figures, the internal combustion engine includes a block 10 delimiting four in-line cylinders 1, 2, 3, 4. The cylinders 1 and 4 are on respective opposite sides of the cylinders 2 and 3. Each cylinder 1, 2, 3, 4 defines a chamber 5 closed at one end by a cylinder head 6 and at the other end by a piston 7 sliding inside the cylinder 1, 2, 3, 4 between two extreme positions (top dead center and bottom dead center) and connected by a connecting rod 8 to a crankshaft 9 pivotally mounted in the block 10.

An intake pipe 11 and an exhaust pipe 12 that are formed in the cylinder head 6 open into each combustion chamber 5. The intake pipe 11 and the exhaust pipe 12 are respectively equipped with an intake valve 13 and an exhaust valve 14 moved between open and closed positions by respective electromagnetic actuators 15, 16.

A spark plug 17 is mounted on the cylinder head 6 and extends into the combustion chamber 5. The spark plug 17 is connected to an ignition circuit known in itself and not shown here.

An injector 18 of a fuel supply device is also mounted on the cylinder head 6.

The engine further includes a combined alternator/starter motor 19 connected in a manner that is known in itself to the crankshaft 9 by a belt 20. The alternator/starter motor 19 is a device, known in itself, connected to the battery and adapted to function either as an electric motor or as an alternator. When it functions as an electric motor, the alternator/starter motor 19 is supplied with power by the battery and applies an additional torque to the crankshaft 9 to drive rotation of the crankshaft 9. Thus the alternator/starter motor 19 is used to start the internal combustion engine. When it functions as an alternator, the alternator/starter motor 19 is driven by the crankshaft 9 to charge the battery.

The engine further includes an engine control unit (ECU) that is part of a device for controlling the operation of the engine also including the alternator/starter motor 19 and the electromagnetic actuators 15, 16. This control unit 21 is connected in particular to the injectors 18, the electromagnetic actuators 15, 16, the ignition circuit and the alternator/starter motor 19 and controls them. The control unit 21, known in itself, includes, for example, a microprocessor 22 associated with a memory 23 containing programs executed by the microprocessor 22. Here the control unit 21 is also adapted to stop the internal combustion engine when the automobile vehicle equipped with the engine is stationary and to start the engine as soon as the driver selects a gear (in the case of a manual gearbox) or depresses the accelerator pedal (in the case of an automatic gearbox).

The device for controlling the operation of the engine preferably includes additional power supply means, such as capacitors, connected to the alternator/starter motor 19 and the actuators 15, 16 to supply them with power, for example as a function of their power requirement. The supply of power is controlled by the control unit 21, for example.

In a manner that is known in itself, the operating cycle of each of the cylinders is a four-stroke cycle including an intake stroke, a compression stroke, an expansion (power) stroke and an exhaust stroke. Each stroke represents one quarter of an operating cycle, i.e. one half-turn of the crankshaft.

Figure 3:
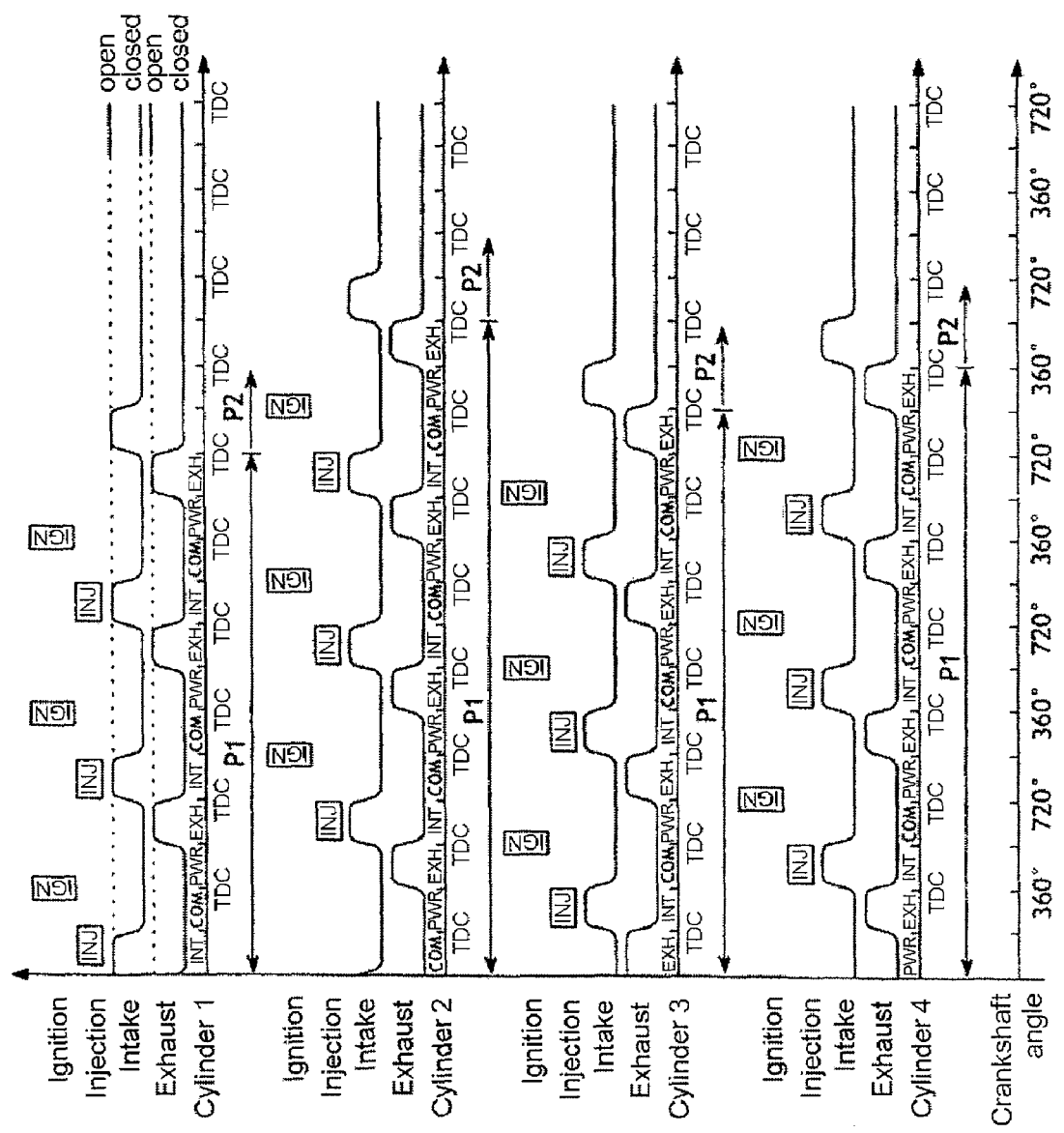
FIG. 3 is a diagram showing the operating cycles of the engine as a function of time.

Referring to FIG. 3, the strokes of each cylinder are denoted INT for intake, COM for compression, PWR for expansion (power) and EXH for exhaust and represent one half-turn of the crankshaft. "IGN" indicates ignition and "INJ" injection of fuel. As is known in itself, the pistons are at the top dead center ("TDC") position at the end of the compression and exhaust strokes and at the bottom dead center position at the end of the intake and power strokes. As is also known in itself, the cylinders 1, 3, 4, 2 perform the same strokes with an offset of one quarter of the operating cycle.

In the normal operating mode (period P1 in FIG. 3), for each cylinder 1, 2, 3, 4:

the intake valve 13 is commanded to open during the intake stroke of the operating cycle of the cylinder, the exhaust valve 14 is commanded to open during the exhaust stroke of the operating cycle of the cylinder, the spark plug 17 is commanded to generate a spark at the end of the compression stroke, the injector 18 is commanded to inject fuel during the intake stroke.

If the driver slows the vehicle until it stops without switching off the ignition, the control unit 21 commands temporary stoppage of the internal combustion engine.

The internal combustion engine is stopped (period P2) by deactivating injection into each cylinder 1, 2, 3, 4 so that the intake stroke is effected without introducing fuel into the combustion chamber 5: the control unit 21 commands the actuator 15 to open the intake valve 13 long enough to introduce air and then closes it. The air is then trapped in the combustion chamber 5, the exhaust valve 14 being held closed. The order of deactivating injection is as follows: cylinder 1, cylinder 3, cylinder 4, cylinder 2. For the purposes of this explanation, here the motor stops once the cylinder 2 has been deactivated, although it is likely that establishing the counter-pressures would stop the engine before this.

When the driver selects a gear to move forward, the control unit 21 commands the alternator/starter motor to drive rotation of the crankshaft 9 and the control unit 21 commands injection into the cylinder on the intake stroke and starts the normal cycle for the other cylinders to start the engine.

In the case of an engine in which the mixing of air and fuel is effected upstream of the intake valve, the engine is stopped by deactivating the ignition circuit. The mixture in the cylinder in the intake stroke is then directly ready for use on restarting.

Another possible mode of operation of the internal combustion engine of the invention is described next.

If the engine is subject to a constant load (i.e. if the speed of the internal combustion engine is constant and the crankshaft 9 is turning at a nominal speed), the control unit 21 commands deactivation of one or two of the cylinders 1, 2, 3, 4. Deactivating one or two of the cylinders 1, 2, 3, 4 produces an imbalance of the crankshaft 9 that is reflected in a succession of acceleration or deceleration of the crankshaft 9. A detector 24 mounted on the block 10 to detect the instantaneous speed of the crankshaft 9 and connected to the control unit 21 transmits to the control unit 21 a signal representative of the instantaneous speed of the crankshaft 9. The control unit 21 then commands the alternator/starter motor 19:

to take more torque from the crankshaft 9 when the crankshaft 9 is accelerating, to bring the crankshaft 9 to its nominal speed, to take less torque from the crankshaft 9 or to supply it with additional torque when the crankshaft 9 is decelerating, to bring the crankshaft 9 to its nominal speed.

Here the torque to be taken and the additional torque to be supplied are determined by the control unit 21 as a function of the difference between the instantaneous speed of the output shaft 9 and its nominal rotation speed for the speed of the engine.

The alternator/starter motor 19 therefore compensates the imbalance of the crankshaft 9 produced by deactivating one or more cylinders.

Here the memory 23 further contains control laws for the alternator/starter motor 19 as a function of the cylinder(s) deactivated. It is possible to control the alternator/starter motor 19 either as a function of the speed detected by the detector 24 or as a function of one of the control laws stored in the memory 23. It is also possible to combine these two control modes to optimize compensation of the imbalance.

The invention is not limited to the embodiment described, of course, and can be modified without departing from the scope of the invention as defined by the claims.

In particular, the invention is applicable to any type of engine and for example to an engine that does not use controlled ignition, such as a diesel engine, a direct injection engine or an indirect injection engine. The number of cylinders can be other than four.

The valves can be immobilized during the temporary stoppage in the open position or in an intermediate position, solving the problem of noise although not establishing counter-pressures to speed up stopping the engine.

Although the invention has been described in relation to an engine in which all of the valves can be controlled individually by an electromagnetic actuator, the invention applies equally to an engine equipped with an actuator enabling only partial deactivation.

The invention claimed is:

1. A method for controlling, during a temporary stoppage, a four-stroke internal combustion engine including a block delimiting cylinders which define combustion chambers equipped with pistons and into which opens an intake pipe and an exhaust pipe, both provided with valves that can move between open positions and closed positions, the engine further comprising an alternator/starter motor, the method comprising:
   detecting the conditions of a temporary stoppage of the four-stroke internal combustion engine; and
   commanding that the intake pipe valves be kept in a closed position once the engine has gone through an intake stroke during a last engine cycle prior to the stoppage,
   wherein the exhaust valves are also held closed during the last engine cycle of the engine prior to stoppage, and wherein the exhaust valves are commanded so that during the temporary stoppage, the cylinder is filled with compressed gas.

2. The method as claimed in claim 1, further comprising:
   in relation to an engine employing direct injection of fuel, stopping injection during an intake stroke preceding the holding of the exhaust pipe valves in the closed position.

3. A device for controlling a four-stroke internal combustion engine including a block delimiting cylinders which define combustion chambers which are equipped with pistons and into which opens an intake pipe and an exhaust pipe, both provided with valves that can move between open positions and closed positions, the engine further comprising a device for supplying the combustion chambers with fuel, at least one electromagnetic valve actuator, and an alternator/starter motor, the device comprising:
   a control unit configured to detect the conditions of a temporary stoppage of the engine and to command holding of the intake valves and the exhaust valves in the closed position after passing through an intake stroke during a last cycle of the engine prior to stoppage,
   wherein the exhaust valves are also held closed during the last engine cycle of the engine prior to stoppage, and wherein the valves are commanded so that during the temporary stoppage, the cylinder is filled with compressed gas.

4. The device as claimed in claim 3, wherein the fuel supply device includes an injector for each combustion chamber, and wherein the control unit is adapted to stop the engine temporarily by commanding stopping of the injector and immobilization of the valve controlled by the actuator in successive combustion chambers.

5. The device as claimed in claim 3, further comprising:
   an electromagnetic actuator controlling each exhaust valve,
   wherein the control unit is adapted to command placement of said actuator in the closed position during temporary stoppage of the engine.

6. The device as claimed in claim 4, wherein, the block delimiting first, second, third, and fourth combustion chambers, the first and fourth combustion chambers being on respective opposite sides of the second and third combustion chambers, the control unit is adapted to command stopping of injection and immobilization of the valves.

* * * * *